US011097944B2

(12) United States Patent
Pach et al.

(10) Patent No.: US 11,097,944 B2
(45) Date of Patent: Aug. 24, 2021

(54) PROCESS FOR REVAMPING AN AMMONIA PLANT

(71) Applicant: JOHNSON MATTHEY PUBLIC LIMITED COMPANY, London (GB)

(72) Inventors: John David Pach, Cleveland (GB); Colin William Park, Cleveland (GB)

(73) Assignee: Johnson Matthey Public Limited Company, London (GB)

( * ) Notice: Subject to any disclaimer, the term of this patent is extended or adjusted under 35 U.S.C. 154(b) by 430 days.

(21) Appl. No.: 16/078,846

(22) PCT Filed: Feb. 6, 2017

(86) PCT No.: PCT/GB2017/050288
§ 371 (c)(1),
(2) Date: Aug. 22, 2018

(87) PCT Pub. No.: WO2017/144850
PCT Pub. Date: Aug. 31, 2017

(65) Prior Publication Data
US 2019/0047852 A1    Feb. 14, 2019

(30) Foreign Application Priority Data

Feb. 25, 2016  (GB) ..................... 1603298

(51) Int. Cl.
| | | |
|---|---|---|
| *C01B 3/02* | (2006.01) | |
| *C01B 3/48* | (2006.01) | |
| *C01C 1/04* | (2006.01) | |
| *C10K 3/04* | (2006.01) | |
| *B01J 35/10* | (2006.01) | |
| *B01J 35/02* | (2006.01) | |
| *B01J 23/86* | (2006.01) | |
| *B01J 23/745* | (2006.01) | |
| *C10G 35/02* | (2006.01) | |
| *C10G 59/02* | (2006.01) | |

(52) U.S. Cl.
CPC ............... *C01B 3/025* (2013.01); *C01B 3/48* (2013.01); *C01C 1/0405* (2013.01); *C10K 3/04* (2013.01); *B01J 23/745* (2013.01); *B01J 23/862* (2013.01); *B01J 35/026* (2013.01); *B01J 35/1014* (2013.01); *C01B 2203/0233* (2013.01); *C01B 2203/0283* (2013.01); *C01B 2203/043* (2013.01); *C01B 2203/0415* (2013.01); *C01B 2203/0445* (2013.01); *C01B 2203/068* (2013.01); *C10G 35/02* (2013.01); *C10G 59/02* (2013.01); *Y02P 20/52* (2015.11)

(58) Field of Classification Search
CPC ... C01B 3/45; C01B 3/025; C01B 2203/0233; C01B 2203/0283; C01B 2203/068; B01J 23/745; B01J 23/862; B01J 35/026; B01J 35/1014

See application file for complete search history.

(56) References Cited

U.S. PATENT DOCUMENTS

| | | |
|---|---|---|
| 4,861,745 A | 8/1989 | Huang et al. |
| 5,656,566 A | 8/1997 | Ward |
| 8,119,099 B2 * | 2/2012 | Schiodt .............. C01B 3/16 423/656 |
| 2011/0172086 A1 | 7/2011 | Birdsall et al. |
| 2013/0101490 A1 * | 4/2013 | Filippi .............. C01B 3/025 423/359 |

FOREIGN PATENT DOCUMENTS

| | | |
|---|---|---|
| EP | 2141118 A1 | 1/2010 |
| EP | 2237882 A2 | 10/2010 |
| EP | 2300359 A1 | 1/2012 |
| EP | 2404869 A1 | 1/2012 |
| EP | 2590893 A1 | 5/2013 |
| EP | 2924002 A1 | 9/2015 |
| WO | WO 2005/019099 A1 | 3/2005 |
| WO | WO 2009/078979 A2 | 6/2009 |

(Continued)

OTHER PUBLICATIONS

Boudjemaa et al., "In Situ DRIFTS Studies of High-Temperature Water-Gas Shift Reaction on Chromium-Free Iron Oxide Catalysts," Comptes Rendus—Chimie, vol. 14, No. 6, Jun. 1, 2011, pp. 534-538.

Banach et al., "Effect of Potassium Addition on a Long Term Performance of Co—ZnO—Al2O3 Catalysts in the Low-Temperature Steam Reforming of Ethanol: Co-Precipitation vs. Citrate Method of Catalysts Synthesis," Applied Catalysis A: General, vol. 505, 2015, 173-182.

Figueiredo et al., "Influence of the Preparation Methods and Redox Properties of Cu/ZnP/Al2O3 Catalysts for the Water Gas Shift Reaction," Journal of Molecular Catalysis A: Chemical, vol. 318, No. 1-2, Mar. 1, 2010, pp. 15-20.

(Continued)

*Primary Examiner* — Jafar F Parsa
(74) *Attorney, Agent, or Firm* — BakerHostetler

(57) ABSTRACT

A method is described for revamping an ammonia production facility said ammonia production facility having a front end comprising one or more reformers fed with a hydrocarbon feedstock at a hydrocarbon feed stock feed rate and a high-temperature shift reactor fed with a reformed gas obtained from said one or more reformers and containing a fixed bed of iron-containing water-gas shift catalyst, said front end operating at a first steam-to-carbon ratio and a first pressure drop, said method comprising the steps of (i) replacing the iron-containing water-gas shift catalyst with a low-steam water-gas shift catalyst to form a modified front end, (ii) operating the modified front end at a second steam-to-carbon ratio and a second pressure drop, wherein the second steam-to-carbon ratio is at least 0.2 less than the first steam-to-carbon ratio and the second pressure drop is less than the first pressure drop, and (iii) increasing the hydrocarbon feed stock feed rate to said one or more reformers.

17 Claims, No Drawings

(56) References Cited

FOREIGN PATENT DOCUMENTS

| WO | WO 2010/000387 A1 | 1/2010 |
| WO | WO 2010/029324 A1 | 3/2010 |
| WO | WO 2012/004032 A1 | 1/2012 |
| WO | WO 2014/019610 A1 | 2/2014 |

OTHER PUBLICATIONS

Reddy et al., "Sulfur Tolerant Metal Doped Fe/Ce Catalysts for High Temperature WGS Reaction at Low Steam to CO Ratios XPS and Mossbauer Spectroscopic Study," Journal of Catalysis, vol. 282, No. 2, Jun. 14, 2011, pp. 258-269.
Xue et al., "Water-Gas Shift Conversion Using a Feed Witty Low Steam to Carbon Monoxide Ratio and Containing Sulphur," Catalysis Today, vol. 30, Jan. 1, 1996, pp. 107-118.
PCT/GB2017/050288 filed Feb. 6, 2017, Written Opinion, dated Apr. 21, 2017.
PCT/GB2017/050288 filed Feb. 6, 2017, International Search Report, dated Apr. 21, 2017.
GB1603298.9, Search Report Under Sectcion 17(5), dated Aug. 19, 2016.
GB1701903.5, Combined Search and Examination Report Under Sections 17 and 18(3), dated Jul. 24, 2017.

\* cited by examiner

PROCESS FOR REVAMPING AN AMMONIA PLANT

CROSS-REFERENCE TO RELATED APPLICATIONS

This application is the National Stage of International Patent Application No. PCT/GB2017/050288, filed Feb. 6, 2017, which claims priority from Great Britain Patent Application No. 1603298.9, filed Feb. 25, 2016, the disclosures of each of which are incorporated herein by reference in their entireties for any and all purposes.

The present invention relates to a method for revamping a high-temperature shift process. More particularly, it relates to a method for revamping a high-temperature shift process in an ammonia plant.

Conventionally, ammonia is produced by the Haber-Bosch process in which hydrogen and nitrogen are reacted at high pressure. The overall stoichiometry for this reaction is:

$$3H_2 + N_2 \rightleftharpoons 2NH_3$$

Typically the hydrogen is obtained by steam reforming hydrocarbon feedstocks, such as natural gas, in a process known as primary reforming to produce a stream comprising un-reacted hydrocarbon, hydrogen, carbon dioxide and carbon monoxide. Nitrogen may be provided from a number of sources but often is provided by secondary reforming the product of primary reforming with air to produce a raw synthesis gas. Catalytic water-gas shift conversion is then used, typically in two stages including a high-temperature shift stage over a bed of an iron-containing catalyst, to convert at least some of the carbon monoxide to carbon dioxide and form additional hydrogen. The carbon dioxide then be removed, for example by absorption. The remaining stream is often subjected to catalytic methanation to convert residual amounts of carbon monoxide and carbon dioxide to methane. The stream from the methanator, which will primarily consist of hydrogen and nitrogen, with trace amounts of methane, is then compressed and passed to the ammonia reactor in which the hydrogen is reacted with the nitrogen to form ammonia.

The minimum steam-to carbon ratio in an ammonia plant is determined taking into account a number of factors including chemical conversion efficiency, carbon formation across the primary reformer and in particular the need to prevent over-reduction of the high temperature shift catalyst, which can lead to unwanted formation of hydrocarbons in the synthesis gas. Many plants are also pressure-drop constrained such that the pressure drop through the plants limits the overall productivity. This means that a reduction in inherent pressure drop can enable an increased plant throughput. Reducing the steam-to-carbon ratio reduces the flow through the plant and hence reduces the pressure drop.

EP2590893 (A1) discloses a process for producing ammonia synthesis gas from a hydrocarbon-containing feedstock, with steps of primary reforming, secondary reforming with an oxidant stream, and further treatment of the synthesis gas including shift, removal of carbon dioxide and methanation, wherein the synthesis gas delivered by secondary reforming is subject to a medium-temperature shift (MTS) over a copper/zinc oxide/alumina catalyst at a temperature between 200 and 350 DEG C., and primary reforming is operated with a steam-to-carbon ratio lower than 2 by installation of an upstream pre-reformer. A corresponding method for revamping an ammonia plant is disclosed, where an existing high-temperature shift (HTS) reactor is modified to operate at medium temperature, or replaced with a new MTS reactor, and a pre-reformer is installed upstream of the primary reformer so that the steam-to-carbon ratio in the primary reformer may be lowered to a value in the range 1.5 to 2.

We have realised that an alternative method may be employed to reduce the steam-to-carbon ratio and increase production without installation of a pre-reformer and MTS reactor.

Accordingly the invention provides a method for revamping and operating an ammonia production facility said ammonia production facility having a front end comprising one or more reformers fed with a hydrocarbon feedstock and a high-temperature shift reactor fed with a reformed gas obtained from said one or more reformers and containing a fixed bed of iron-containing water-gas shift catalyst, said front end operating at a first steam-to-carbon ratio and a first pressure drop, said method comprising the steps of (i) replacing the iron-containing water-gas shift catalyst with a low-steam water-gas shift catalyst to form a modified front end, (ii) operating the modified front end at a second steam-to-carbon ratio and a second pressure drop, wherein the second steam-to-carbon ratio is at least 0.2 less than the first steam-to-carbon ratio and the second pressure drop is less than the first pressure drop, and then (iii) increasing the hydrocarbon feed stock feed rate to said one or more reformers.

The reduction in front-end pressure drop brought about by replacing the catalyst in the water-gas shift reactor and adjusting the steam-to-carbon ratio allows the operator of the ammonia process to increase the hydrocarbon feedstock flow to the one or more reformers and thereby make more ammonia. Thus the term "revamping" in the present application means a method of increasing the ammonia production from an existing ammonia production facility.

The synthesis gas generation stage may be based on steam reforming of a hydrocarbon feedstock such as natural gas, naphtha or a refinery off-gas. This may be achieved by primary reforming a hydrocarbon feedstock with steam in externally-heated catalyst-filled tubes in a fired- or gas-heated steam reformer and optionally secondary reforming the primary-reformed gas mixture in a secondary reformer, by subjecting it to partial combustion with an oxygen-containing gas and then passing the partially combusted gas mixture through a bed of steam reforming catalyst. The oxygen-containing gas may be air, oxygen or oxygen-enriched air. A primary reforming catalyst typically comprises nickel at levels in the range 1-30% wt, supported on shaped refractory oxides, such as alpha alumina or magnesium- or calcium aluminates. Alternatively, structured catalysts, wherein a nickel or precious metal catalyst is provided as a coated surface layer on a formed metal or ceramic structure may be used, or the catalysts may be provided in a plurality of containers disposed within the tubes. Steam reforming reactions take place in the tubes over the steam reforming catalyst at temperatures above 350° C. and typically the process fluid exiting the tubes is at a temperature in the range 650-950° C. The heat exchange medium flowing around the outside of the tubes may have a temperature in the range 900-1300° C. The pressure may be in the range 10-80 bar abs. In a secondary reformer, the primary-reformed gas, which may contain a further portion of the hydrocarbon feedstock is partially combusted in a burner apparatus mounted usually near the top of the reformer. The partially combusted reformed gas is then passed adiabatically through a bed of a steam reforming catalyst disposed below the burner apparatus, to bring the gas composition towards equilibrium. Heat for the endothermic steam reforming reaction is supplied by the hot, partially combusted reformed gas. As the partially combusted reformed gas contacts the steam reforming catalyst it is cooled by the endothermic steam reforming reaction to temperatures in the range 900-1100° C. The bed of steam reforming catalyst in the secondary reformer typically comprises nickel at levels in the range 1-30% wt, supported on shaped refractory oxides, but layered beds may be used wherein the uppermost catalyst layer comprises a precious metal, such as platinum or rhodium, on a zirconia support. Such steam reforming apparatus and catalysts are commercially available.

Alternatively, the steam reforming may be achieved by passing a mixture of the hydrocarbon and steam through an adiabatic pre-reformer containing a bed of steam reforming catalyst and then passing the pre-reformed gas mixture to an autothermal reformer which operates in the same way as the secondary reformer to produce a gas stream containing hydrogen, carbon oxides and steam. Nitrogen will also be present in the gas stream where the autothermal reformer is fed with air or oxygen-enriched air. In adiabatic pre-reforming, a mixture of hydrocarbon and steam is passed at an inlet temperature in the range 300-620° C. to a fixed bed of pelleted nickel-containing pre-reforming catalyst. Such catalysts typically comprise ≥40% wt nickel (expressed as NiO) and may be prepared by co-precipitation of a nickel-containing material with alumina and promoter compounds such as silica and magnesia. Again, the pressure may be in the range 10-80 bar abs.

In a preferred process, the ammonia production facility front end comprises a fired steam reformer and optionally a secondary reformer. Hence the syngas generation stage preferably comprises primary reforming a hydrocarbon feedstock, particularly natural gas, with steam in a fired steam reformer to produce a gas stream comprising hydrogen, carbon monoxide, carbon dioxide and steam, and optionally a secondary reforming stage in which the primary reformed gas, optionally with a further portion of the hydrocarbon, is further reformed in a secondary reformer using air, enriched air or oxygen. Air is preferred.

The ammonia production facility front end further comprises a high temperature shift reactor containing a fixed bed of iron-containing water-gas shift catalyst. The reformed gas stream which typically comprises hydrogen, carbon monoxide, carbon dioxide and steam, and potentially also methane and nitrogen is subjected, optionally after temperature adjustment, to one or more catalytic water-gas shift stages by passing the gas mixture at elevated temperature and pressure over a water-gas shift catalyst. If insufficient steam is present, steam may be added to the gas stream before it is subjected to the water-gas shift conversion. The water-gas shift reaction may be depicted as follows;

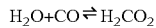

The reaction may be carried out in one or more stages, including a step of high temperature shift, performed in a high temperature shift reactor containing a high temperature shift catalyst. For high temperature shift catalysts, the inlet temperature to the shift reactor is preferably in the range 280-500° C. more preferably 300-450° C. and most preferably 310-380° C. so that the performance of the catalyst over an extended period is maximised. The shift process is preferably operated adiabatically without cooling of the catalyst bed, although if desired some cooling may be applied for example by passing cooling water under pressure through tubes disposed within the catalyst bed. The exit temperature from the shift reactor is preferably ≤600° C., more preferably ≤550° C. to maximise the life and performance of the catalyst. Optionally, the shifted gas stream from the high temperature shift reactor may be cooled and subjected to one or more further stages of water-gas shift selected from medium temperature shift and/or low temperature shift. Medium temperature shift and low temperature shift catalysts are typically copper-zinc oxide-alumina compositions. For medium temperature shift catalysts, the inlet temperature may be in the range 190-300° C. and for low-temperature shift catalysts the inlet temperature may be 185-270° C. The flow-rate of synthesis gas containing steam may be such that the gas hourly space velocity (GHSV) through the one or more beds of water-gas shift catalyst in the reactors is ≥6000 hour$^{-1}$. The shift stage may be operated at a pressure in the range 1-100 bar abs, more preferably 15-50 bar abs.

In the present invention, an iron-containing high temperature water gas shift catalyst in a high temperature shift reactor is replaced with a low-steam high temperature water-gas shift catalyst and the steam-to-carbon ratio through the front end adjusted from a first, higher, steam-to-carbon ratio to a second, lower, steam-to-carbon ratio. The second steam-to-carbon ratio is at least 0.2 lower than the first steam-to-carbon ratio, and may be at least 0.3 or 0.4 lower than the first steam-to-carbon ratio. The adjustment may be made by reducing the steam flowrate to the process before the one or more steam reformers. The first steam to carbon ratio may be ≥1.5 but more typically is e.g. ≥2.5 to 3.5. By adjusting the steam-to-carbon ratio, the steam to dry gas ratio at the inlet to the high temperature shift reactor may usefully be reduced to ≤0.45:1, preferably ≤0.42:1.

In addition, the pressure drop through the front end is reduced by reducing the steam ratio. The front end pressure drop may be considered as the pressure drop between the point at which the steam is added and at which, downstream of the water gas shift, the shifted gas is cooled to condense unreacted steam as water. The first pressure drop through the front end may be ≥5 barg, e.g. in the range 5 to 20 barg, typically 10-20 barg. The second pressure drop is less than the first pressure drop, preferably at least 1 barg lower than the first pressure drop.

The process of the present invention includes, after reducing the front-end pressure drop by replacing the high temperature shift catalyst and reducing the steam to carbon ratio, increasing the hydrocarbon feedstock feed rate to said one or more reformers. Increasing the hydrocarbon feedstock feed rate increases the front-end pressure drop back towards the first pressure drop of the front-end of the process. The front-end pressure drop after increasing the hydrocarbon flowrate may be in the range 90-100% of the first front-end pressure drop.

The replaced iron-containing water-gas shift catalyst may be a conventional chromia-promoted magnetite catalyst. Such catalysts are typically in the form of cylindrical pellets.

The low steam water gas shift catalyst may be an enhanced iron-containing high temperature shift catalyst or an iron-free high temperature shift catalyst.

The enhanced iron-containing water gas shift catalyst has properties that enable it to be operated at lower steam to carbon ratios than the replaced catalyst. Thus the enhanced iron-containing high temperature shift catalyst may have a high geometric surface area (GSA) and/or may contain one or more shift promoters. The enhanced iron-containing high temperature shift catalyst may be made by precipitation of iron and other metal compounds (that decompose to the oxides upon heating) from a solution of iron and metal salts by the addition of a suitable alkaline reactant, e.g. sodium hydroxide or carbonate. The resulting precipitate is then washed, dried and preferably calcined. The BET surface area, as determined by nitrogen physisorption is preferably in the range 20-40 m$^2$/g, preferably 20-34 m$^2$/g, most preferably 20-30 m$^2$/g. The dried or calcined catalyst precursor typically has an iron oxide content (expressed as Fe$_2$O$_3$) of 60 to 95% by weight. If chromium oxide is present, the iron to chromium atomic ratio in the precursor may be in the range 6 to 20, particularly 8 to 12. The dried or calcined material may be tableted to form catalyst precursor pellets. The pellets may be cylindrical with a length in the range 3-10 mm and a diameter in the range 5-15 mm, preferably 5 mm-10 mm.

The geometric surface area of the low steam water-gas shift catalyst pellets is preferably greater than that of the replaced catalyst. The geometric surface area should not be increased by using a smaller pellet diameter or length than the replaced catalyst as this increases the pressure drop through the water-gas shift reactor, which is undesirable. Rather, the geometric surface area is preferably increased by means of shaping the catalyst with two, three or more lobes or flutes around the periphery of the pellet. A particularly preferred shape is a cylindrical pellet having a length C and diameter D, wherein the surface of the cylindrical pellet has two or more flutes running along its length, said cylinder having domed ends of lengths A and B such that (A+B+C)/D is in the range 0.25 to 1.25, and (A+B)/C is in the range 0.03 to 0.3. Preferably (A+B+C)/D is in the range 0.50 to 1.00, more preferably 0.55 to 0.70, most preferably 0.55 to 0.66. Preferably (A+B)/C is in the range 0.05 to 0.25, more preferably 0.1 to 0.25. The pellet may have 3 to 12, preferably 3 to 7, more preferably 3 to 5 semi-circular, elliptical, or U shaped flutes, evenly spaced about the circumference of the pellet and running axially along its length. The flutes may have a width d" in the range of 0.1 D to 0.4 D, preferably 0.1 D to 0.25 D when 5 flutes are present, preferably 0.2-0.30 D when 4 flutes are present and preferably 0.25-0.4 D when 3 flutes are present, and desirably the total flute width is ≤35% of the circumference of the pellet. A preferred shape is a cylindrical pellet with a length 4 to 5 mm, diameter 8 to 9 mm and having three four or especially five evenly-spaced peripheral flutes running axially along the length of the pellet. The pellet surface area of a low steam high temperature shift catalyst is preferably ≥235 mm$^2$. The surface area of a low steam high temperature shift catalyst, expresses as m$^2$ per cubic metre of catalyst pellets is preferably ≥520 m$^2$/m$^3$, more preferably ≥530 m$^2$/m$^3$, most preferably ≥535 m$^2$/m$^3$.

Iron-containing high temperature shift catalysts, prior to reduction, desirably contain copper oxide or manganese oxide as a shift promoter. The iron to copper or manganese atomic ratio is preferably in the range 10:1 to 100:1. Preferably the enhanced iron containing high temperature shift catalyst comprises one or more iron oxides stabilised with chromia and/or alumina and which may optionally contain zinc oxide and one or more copper compounds.

Prior to use for the shift reaction, the pellets are subjected to reduction conditions wherein the iron oxide is reduced to magnetite (Fe$_3$O$_4$) and any chromium trioxide present reduced to the sesquioxide, chromia (Cr$_2$O$_3$). This reduction is often carried out in the reactor wherein the shift reaction is to be effected. The activity of the enhanced iron-containing high temperature shift catalyst may be significantly increased by incorporating into the catalyst precursor particles of aspect ratio of at least 2 and a maximum dimension of at least 5000 Å (500 nm), and preferably less than 15000 Å (1500 nm) into the catalyst precursor pellets. Preferably the enhanced iron-containing high temperature shift catalyst comprises acicular iron oxide particles. Such catalysts compositions containing iron and chromium oxides are described in U.S. Pat. No. 5,656,566. Alternatively, it may be desirable to at least partially replace the chromium oxide in the iron-based catalyst with alumina or another stabilising oxide. Zinc oxide and copper may desirably also be present. Such catalysts are described for example in EP2237882.

Alternatively, the low steam high temperature shift catalyst may be an iron-free water gas shift catalyst. Suitable catalysts of this type include those comprising a zinc-aluminate spinel. Thus the low steam water gas shift catalyst may comprise a mixture of zinc alumina spinel and zinc oxide in combination with an alkali metal selected from the group consisting of Na, K, Rb, Cs and mixtures thereof. Such catalysts are described for example in EP2141118 and EP2300359. Alternatively, the low steam high temperature shift catalyst may comprise a metal-doped zinc oxide/alumina composition. For example a suitable catalyst containing oxides of zinc and aluminium together with one or more promoters selected from Na, K, Rb, Cs, Cu, Ti, Zr, rare earth elements and mixtures thereof. Such catalysts are described for example in EP2924002. The iron-free catalysts may be cylindrical pellets or shaped as described above.

In the production of ammonia, the shifted gas mixture recovered from the front end may be subjected to a carbon dioxide removal stage, methanation to remove traces of carbon oxides, optional adjustment of the H$_2$:N$_2$ molar ratio, and then ammonia synthesis.

Any suitable carbon dioxide removal unit may be used. Carbon dioxide removal units may function by reactive absorption, such as those known as aMDEA™ or Benfield™ units that are based on using regenerable amine or potassium carbonate washes, or by physical absorption, based on using methanol, glycol or another liquid at low temperature, such as Rectisol™ Selexol™ units. Carbon dioxide removal may also be performed by pressure-swing adsorption (PSA) using suitable solid adsorbent materials. The carbon dioxide removal unit may also function to simultaneously remove residual steam, primarily by condensation due to the low operating temperatures. Such carbon dioxide removal apparatus and solvents are commercially available.

In a methanation stage, residual carbon monoxide and carbon dioxide in the hydrogen gas stream may be converted to methane over a methanation catalyst in a methanator. Any suitable arrangement for the methanator may be used. Thus the methanator may be operated adiabatically or isothermally. One or more methanators may be used. A nickel-based methanation catalyst may be used. For example, in a single methanation stage the gas from the carbon dioxide removal stage may be fed at an inlet temperature in the range 200-400° C. to a fixed bed of pelleted nickel-containing methanation catalyst. Such catalysts are typically pelleted compositions, comprising 20-40% wt nickel. Such methanation apparatus and catalysts are commercially available. The pressure for methanation may be in the range 10-80 bar abs.

The resulting hydrogen and nitrogen containing synthesis gas (syngas), is compressed in a first and one or more further compression stages to the ammonia synthesis pressure and passed to an ammonia production unit. If air or oxygen-enriched air is used in the syngas generation step then sufficient nitrogen may already be present in the hydrogen gas stream, but if not, then additional nitrogen may be added to the syngas, e.g. from an air separation unit or nitric acid plant vent gas.

The ammonia production unit comprises an ammonia converter containing an ammonia synthesis catalyst. The nitrogen and hydrogen in the syngas react together over the catalyst to form the ammonia product. Ammonia synthesis catalysts are typically iron based but other ammonia synthesis catalysts may be used. The reactor may operate adiabatically or may be operated isothermally. The catalyst beds may be axial and/or radial flow and one or more beds may be provided within a single converter vessel. The conversion over the catalyst is generally incomplete and so the synthesis gas is typically passed to a loop containing a partially reacted gas mixture recovered from the ammonia converter and the resulting mixture is fed to the catalyst. The synthesis gas mixture fed to the loop may have a hydrogen to nitrogen ratio of 2.2-3.2. In the ammonia production unit, the hydrogen/nitrogen mixture may be passed over the ammonia synthesis catalyst at high pressure, e.g. in the range 80-350 bar abs, preferably 150-350 bar abs for large-scale plants, and a temperature in the range 300-540° C., preferably 350-520° C.

The ammonia produced in the ammonia production unit may be sold and/or a portion converted into nitric acid, ammonium nitrate or urea. Any suitable process for producing nitric acid, ammonium nitrate or urea may be used.

The reduced front-end pressure drop may also be deployed in such ways as to: a) reduce air compressor discharge pressure thereby allowing an increase in rate of an otherwise bottle-necked process air compressor; b) reduce the required hydrocarbon supply pressure thereby allowing an increase in rate of an otherwise bottle-necked hydrocarbon compressor or pressure-constrained natural gas supply; and c) increase synthesis gas compressor suction pressure allowing an increase in rate of an otherwise bottle-necked synthesis gas compressor.

The present invention will now be described with reference to the following examples.

EXAMPLE 1

A large scale ammonia process was modelled using Aspen HYSYS, to ascertain the effects of changes to the steam ratio. The unit operations of the process are as follows; purification, primary and secondary steam reforming, high temperature and low temperature shift, $CO_2$ removal, methanation, compression and ammonia synthesis. The process operated with a conventional iron-based high temperature shift catalyst operates at a steam to dry gas molar ratio of 0.48 at the inlet to the high temperature shift (HTS) unit. Replacement of the conventional iron-based high temperature shift catalyst with the low steam water gas shift catalyst, KATALCO™ 71-6, enabled the steam to dry gas ratio to be reduced to 0.40. Correspondingly, the steam-to-carbon ratio at the inlet of the primary reformer was reduced from 2.9 to 2.5.

The enhanced iron containing high temperature shift catalyst used in this example, Katalco™ 71-6, is a co-precipitated iron chromia high temperature shift catalyst with a BET surface area in the range 20-30 $m^2/g$. Both the replaced conventional iron-based catalyst and the KATALCO™ 71-6 catalyst were cylindrical pellets with lengths in the range 4.8-4.9 mm and diameters in the range 8.3 to 8.5 mm.

|  | Nitrogen Physisorption BET Surface Area $(m^2g^{-1})$ | |
|---|---|---|
|  | min | max |
| Katalco ™ 71-16 | 20 | 30 |

The reduction in steam ratio enabled a 6% increase in throughput for an equivalent pressure drop over the front end of the plant, where the steam/water and process air are increased in step with the process gas flow. This increased plant throughput corresponds to a 4.6% increase in molar flow to syngas compression and a 3.4% increase in terms of ammonia production.

When throughput is constrained by the syngas compressor, the reduction in steam to dry gas ratio increases the supply pressure to the inlet of the compressor, decreasing the pressure ratio and thus enabling increased flowrate. For a typical compressor operating close to its optimum efficiency at 100% speed, the gradient of the compressor performance curve is such that the reduction in pressure ratio would enable a 4% increase in throughput in this case (corresponding to a 1% drop in pressure ratio). This increased plant throughput corresponds to a 2.8% increase in molar flow to syngas compression and a 2% increase in terms of Ammonia production.

|  | Comparative | Comparative Replaced HTS Catalyst No increase in hydrocarbon feedrate | Replaced HTS Catalyst Increased hydrocarbon feed | |
|---|---|---|---|---|
|  | Original HTS catalyst Initial | Throughput increase 0% | Throughput increase 4% | Throughput increase 6% |
| Pressure Inlet 1st stage of syngas compression (barg) | 32.00 | 34.20 | 32.81 | 32.46 |
| Molar flow Inlet 1st stage of syngas compression (kmolh$^{-1}$) | 12100 | 11988 | 12436 | 12659 |

-continued

|  | Comparative | Comparative Replaced HTS Catalyst No increase in hydrocarbon feedrate | Replaced HTS Catalyst Increased hydrocarbon feed | |
|---|---|---|---|---|
|  | Original HTS catalyst Initial | Throughput increase 0% | Throughput increase 4% | Throughput increase 6% |
| Increase in molar flow Mass flow Inlet 1st stage of syngas compression ($teh^{-1}$) | — 106.8 | −0.009 107.0 | 0.028 111.2 | 0.046 113.3 |
| Increase in mass flow | 0 | 0.003 | 0.042 | 0.061 |
| Pressure drop (bar) | 15.30 | 13.10 | 14.49 | 14.84 |
| Compression ratio | 1.84 | 1.80 | 1.83 | 1.83 |
| Compressor available flow ratio | 1.000 | 1.087 | 1.043 | — |

|  | Comparative | Throughput increase | |
|---|---|---|---|
|  | Initial | 4% | 6% |
| Ammonia Production ($teday^{-1}$) | 2206.9 | 2250.4 | 2282.8 |
| % of base-case production | 100.0 | 102.0 | 103.4 |

The invention claimed is:

1. A method for revamping an ammonia production facility, said ammonia production facility having a front end comprising:
(a) one or more reformers fed with a hydrocarbon feedstock at a hydrocarbon feed stock feed rate; and
(b) a high-temperature shift reactor fed with a reformed gas obtained from said one or more reformers, the high-temperature shift reactor having an inlet temperature in a range of from 300° C. to 450° C. and containing a fixed bed of iron-containing a high-temperature water-gas shift catalyst,
said front end operating at a first steam-to-carbon ratio at or above 1.5 and a first pressure drop at or above 5 barg, said method comprising the steps of:
(i) replacing the iron-containing high-temperature water-gas shift catalyst with a low-steam water-gas shift catalyst to form a modified front end, wherein the low steam water gas shift catalyst is
an enhanced iron-containing high temperature shift catalyst that is a precipitated iron-containing catalyst with an iron oxide content, expressed as $Fe_2O_3$, of 60 to 95% by weight, having a BET surface area in the range of from 20 $m^2/g$ to 40 $m^2/g$, or
an iron-free high temperature shift catalyst comprising a zinc-aluminate spinel or oxides of zinc and aluminum and one or more promoters that is Na, K, Rb, Cs, Cu, Ti, Zr, a rare earth element or a mixture thereof,
(ii) configuring the modified front end to operate at a second steam-to-carbon ratio and a second pressure drop, wherein the second steam-to-carbon ratio is at least 0.2 less than the first steam-to-carbon ratio and the second pressure drop is less than the first pressure drop, and
(iii) increasing the hydrocarbon feed stock feed rate to said one or more reformers;
such that the high-temperature shift reactor remains configured to operate under high-temperature water-gas shift conditions.

2. The method of claim 1, wherein the ammonia production facility front end comprises a fired steam reformer and optionally a secondary reformer.

3. The method of claim 1, wherein the high temperature shift reactor is operated at an inlet temperature in the range of from 310 to 380° C. and at a pressure in the range of from 1 to 100 bar abs.

4. The method of claim 1, wherein the second steam-to-carbon ratio is at least 0.3 less than the first steam-to-carbon ratio.

5. The method of claim 1 wherein the steam to dry gas ratio at the inlet to the high temperature shift reactor is reduced to 0.45:1 or less after replacement of the iron-containing high-temperature water-gas shift catalyst with the low-steam water-gas shift catalyst.

6. The method of claim 1, wherein the second pressure drop through the front end is at least 1 barg lower than the first pressure drop through the front end.

7. The method of claim 1 wherein the low steam water gas shift catalyst is the iron-free high temperature shift catalyst comprising the zinc-aluminate spinel or oxides of zinc and aluminum and one or more promoters that is Na, K, Rb, Cs, Cu, Ti, Zr, a rare earth element or a mixture thereof.

8. The method of claim 1, wherein the low steam water gas shift catalyst is the enhanced iron-containing water gas shift catalyst that is the precipitated iron-containing catalyst with an iron oxide content, expressed as $Fe_2O_3$, of 60 to 95% by weight, having a BET surface area in the range of from 20 $m^2/g$ to 34 $m^2/g$.

9. The method of claim 1, wherein the low steam water gas shift catalyst is the enhanced iron-containing water gas shift catalyst is in the form of a cylindrical pellet having a length C and diameter D, wherein the surface of the cylindrical pellet has two or more flutes running along its length, said cylinder having domed ends of lengths A and B such that (A+B+C)/D is in the range of from 0.25 to 1.25, and (A+B)/C is in the range of from 0.03 to 0.3.

10. The method of claim 1, wherein the low steam water gas shift catalyst is the enhanced iron-containing water gas shift catalyst comprising one or more iron oxides stabilized with chromia, acicular iron oxide particles, and one or more copper compounds.

11. The method of claim 1, wherein the low steam water gas shift catalyst is the iron-free high temperature shift catalyst comprising the zinc-aluminate spinel.

12. The method of claim 1, wherein the low steam water gas shift catalyst comprises a mixture of zinc alumina spinel and zinc oxide in combination with an alkali metal that is Na, K, Rb, Cs, or a mixture thereof.

13. The method of claim 1, wherein the low steam water gas shift catalyst is the iron-free high temperature shift catalyst comprising the oxides of zinc and aluminum and one or more promoters that is Na, K, Rb, Cs, Cu, Ti, Zr, a rare earth element, or a mixture thereof.

14. The method of claim 1, wherein the front-end pressure drop is increased by the increase in hydrocarbon feedstock feed rate in step (iii) to 90-100% of the first front-end pressure drop.

15. The method of claim 1, wherein the second steam-to-carbon ratio is at least 0.4 less than the first steam-to-carbon ratio.

16. The method of claim 1, wherein the steam to dry gas ratio at the inlet to the high temperature shift reactor is reduced after replacement of the iron-containing water-gas shift catalyst to ≤0.42:1.

17. The method of claim 1, wherein the low steam water gas shift catalyst is the enhanced iron-containing water gas shift catalyst having a BET surface area in a range of from 20 $m^2/g$ to 34 $m^2/g$.

* * * * *